(12) United States Patent
Adler et al.

(10) Patent No.: US 6,547,967 B1
(45) Date of Patent: Apr. 15, 2003

(54) CERAMIC NETWORK, METHOD FOR THE PRODUCTION AND UTILIZATION THEREOF

(75) Inventors: Jörg Adler, Meissen (DE); Heike Heymer, Dresden (DE); Gisela Standke, Dresden (DE)

(73) Assignee: Franhofer-Gesellschaft zur Forderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 09/555,609

(22) PCT Filed: Nov. 30, 1998

(86) PCT No.: PCT/EP98/07711
§ 371 (c)(1),
(2), (4) Date: May 31, 2000

(87) PCT Pub. No.: WO99/28272
PCT Pub. Date: Jun. 10, 1999

(30) Foreign Application Priority Data

Dec. 1, 1997 (DE) .......................................... 197 53 249

(51) Int. Cl.[7] .......................... B01D 39/20; B01J 23/00; B01J 20/00
(52) U.S. Cl. ............... 210/500.25; 55/523; 210/500.26; 210/510.1; 264/44; 504/300; 504/439
(58) Field of Search ....................... 210/500.25, 500.26, 210/510.1; 55/523; 264/44, 49; 502/300, 439

(56) References Cited

U.S. PATENT DOCUMENTS

| | | |
|---|---|---|
| 3,090,094 A | 5/1963 | Schwartzwalder et al. |
| 4,765,833 A | 8/1988 | Narumiya et al. |
| 4,900,483 A | 2/1990 | Witzke et al. |
| 4,912,076 A | 3/1990 | Mizrah et al. |
| 5,066,432 A | 11/1991 | Gabathuler et al. |
| 5,075,160 A | 12/1991 | Stinton et al. |
| 5,094,906 A | 3/1992 | Witzke et al. |
| 5,188,776 A | 2/1993 | Witzke et al. |
| 5,279,993 A | 1/1994 | Rothfuss et al. |

FOREIGN PATENT DOCUMENTS

| | | |
|---|---|---|
| DE | 3539522 | 5/1986 |
| DE | 3540449 | 6/1986 |
| EP | 0312501 | 4/1989 |
| EP | 0443228 | 8/1991 |
| EP | 0490062 | 6/1992 |
| GB | 2168337 | 6/1986 |

OTHER PUBLICATIONS

Brown et al., "Investigation of Strut Crack Formation in Open Cell Alumina Ceramics", J. Am. Ceram. Soc. 77(6), pp 1467–72 (1994).
Cahn et al., Material Science and Technology, vol. 11, VCH 1994, pp 474 and 475.
Klemper, Handbook of Polymeric Foams and Foam Technology, p 24, 28–29, 9–10. (Undated).
Saggio–Woyansky et al., "Processing of Porous Ceramics", Am. Ceram Soc. Bull., vol. 71 (11) pp 1674–81 (1992).
Tarakanov et al., "Thermodestruction and Thermooxidative Destruction of Polyurethanes", J.Polym.Sci: Part C., vol. 23, pp 117–125 (1968).
Oakey et al., "The Behavior of High Temperature Filter Materials in hot Gasifier and Combustor Gas Atmospheres", I ChemE Symposium Series No. 99 (1986) pp 421–443.
MTZ Motortechnische Zietschrift 56, pp 88–94 (1995).
Brezny et al., "Evaluation of Strut Strength in Open–Cell Ceramics", J. Am. Ceram. Soc. 72(6), pp 885–889 (1989).

*Primary Examiner*—John Kim
(74) *Attorney, Agent, or Firm*—Greenblum & Bernstein, P.L.C.

(57) ABSTRACT

The present invention relates to the field of ceramics and to a ceramic network which can, for example, be applied as a deep-bed filter and a method for the production and utilization thereof. The present invention provides a ceramic network in which the mechanical stability is improved and/or an application-dependent structure can be specifically adjusted. To this end, a ceramic network is provided which comprises two or three dimensional ceramic struts that are connected to one another. The cavities in the ceramic struts have a cross-sectional area with a circular or approximately circular or extensively circular or a convex or multiply convex contour. In addition, a method is provided in which a fiber network is produced. The fiber network comprises polymer fibers and/or natural fibers and/or other fibers, with the fibers each having cross-sectional area with a circular or approximately circular or extensively circular or a convex or multiply convex contour. According to the present invention, a ceramic network is utilized while in contact with liquids or gases.

23 Claims, No Drawings

CERAMIC NETWORK, METHOD FOR THE PRODUCTION AND UTILIZATION THEREOF

BACKGROUND OF THE INVENTION

1. Field of the Invention

The invention relates to the field of ceramics and concerns a ceramic network, such as can be used, for example, as a deep-bed filter, more particularly as a molten metal filter, as a support for filtration, heat exchanger, regenerator, electrically heatable thermostat, catalyst support, burner element for radiant heaters and space heaters, reaction chamber fill element, sound absorber, stiffening element for panels, or as a ceramic reinforcement material for metal matrix composites (MMC's), and a method for the production and utilization thereof.

2. Discussion of Background Information

Ceramic networks in the form of open-cell ceramic foams are known.

Methods are known for the manufacture of such open-cell ceramic foams using the so-called "Schwartzwalder method," which is used industrially and is the most common. This method is described in U.S. Pat. No. 3,090,094. In accordance with this method, the desired component is cut from an open-cell polymer foam and subsequently impregnated with a suspension of ceramic particles and water or solvent. Then the impregnated polymer foam is mechanically squeezed one or more times, and subsequently dried. Next the polymer foam is burned out, followed by sintering of the remaining ceramic coating.

Open-cell ceramic foam manufactured by this method is a replication of the cell-like polymer structure of the starting material. As a result of burning out the polymer foam, the remaining ceramic struts are hollow. The cross-section of these struts is three-cornered, and the shape of the cavities is also three-cornered in cross-section. The ceramic coating is often cracked at the edges of the cavities. The cavities and the cracks result in a very low mechanical strength. Because the susceptibility to cracking is increased even further by shrinkage of the ceramic coating during sintering, relatively low-shrink materials are used, but they exhibit high internal porosity after sintering. This likewise results in low mechanical strength. See J. Am. Ceram. Soc. 77(6), 1467–72 (1994).

Thus, the ceramic foams manufactured from polymer foams with the aforementioned method have cavities with a concave, three-cornered cross-section inside the ceramic struts. See (Cahn, R. W., Haasen, P., Kramer, E. J. (ed.): Material Science and Technology, Vol. 11, VCH 1994, p. 474. The shape of this cavity is very unfavorable for the mechanical strength of the struts in the ceramic foam, since the load-bearing area of the points of the triangles is only very small. Due to the susceptibility of the brittle ceramic to the formation of cracks, the very sharply pointed shape of the three-cornered cavities is also problematic, since cracks nearly always form starting from there, further decreasing the strength of the ceramic strus. See (J. Am. Ceram. Soc. 77(6), 1467–72 (1994). Consequently, the foams produced with the Schwartzwalder method have a low mechanical strength, which is disadvantageous for the aforementioned applications as well as for the handling and transport of such ceramic foams.

The foam materials used for molding are produced by foaming a mixture of various chemical components. During the reaction of the fluid components with one another, a gas is produced, which causes gas bubbles to form and grow in the fluid. Moreover, the starting components polymerize, increasing the viscosity of the fluid. At the end of the reaction, a solid polymer forms that contains a large number of gas bubbles (polymer foam). The size of the bubbles in the polymer foam can be controlled within certain limits by the choice of the starting components and by regulating the reaction.

By a subsequent treatment known as reticulation, the membranes separating the gas bubbles are completely removed by chemical or thermal means, creating the open-celled polymer foam required for manufacture of the ceramic. This foam now consists only of polymer struts that have formed between three adjacent gas bubbles. See Klemper D. and Frisch K. C. (Ed.): Handbook of Polymeric Foams and Foam Technology, Hanser 1991, p. 24.

As a result of the nature of gas bubble foaming, the surfaces of the polymer foam are always concave in shape. Thus, the cross-sections of the polymer struts forming the foam have the shape of triangles with concave sides having very sharply angled points. See Klemper D. and Frisch K. C. (Ed.): Handbook of Polymeric Foams and Foam Technology, Hanser 1991, p. 28/29. This is considered a law of nature for all foamed materials.

Also, the gas bubbles that occur during foaming of the polymers cannot be created in unlimited size. When the gas bubbles are too large, the foam collapses before polymerization has brought about solidification of the foam. See Klemper D. and Frisch K. C. (Ed.): Handbook of Polymeric Foams and Foam Technology, Hanser 1991, p. 9. The upper limit for the most commonly used polymer foam of polyurethane flexible foam is approximately 5 pores per inch (approximately 5 mm maximum cell size). Hence this also presents a limitation on the possibilities for using polymer foam for the manufacture of ceramic foam.

It is further known that the foam used is generally polyurethane foam. See (Am. Ceram. Soc. Bull. 71 (11) (1992). However, a disadvantage of the use of polyurethane as the starting structure for ceramic foam manufacture is that gases which are toxic or hazardous to health, e.g., isocyanates or hydrogen cyanide, can be released during the necessary thermal decomposition of the polyurethane. See J. Polymn. Sci. C, 23, pp. 117–125 (1968)

To somewhat mitigate the problems of mechanical strength, DE 35 40 449 and DE 35 39 522 propose applying multiple coatings to the polyurethane foam used. This increases the thickness of the ceramic struts and thus the mechanical strength of the sintered ceramic foam as well.

The increased process cost for the multiple coating is problematic. Furthermore, the ceramic coating has only low strength prior to sintering, and consequently the mechanical loading of the coated polymer foam necessary for separating the excess suspension during multiple coating frequently leads to new defects in the coating. In principle, however, multiple coating also does not eliminate the disadvantage mentioned of unfavorably shaped concave three-cornered cavities of the struts.

It is likewise known to use ceramic fibers as monofilaments or multifilaments for the manufacture of porous ceramics: which fibers can be laid, knitted, sewn or glued. See IChemE Symposium Series No. 99, pp 421–443 (1986); MTZ Motortechnische Zeitschrift 56(2), pp 88–94 (1995).

A disadvantage here is that such ceramic fibers are difficult and expensive to produce, and thus are very expensive, and are difficult to process since they are very brittle. For example, knitting techniques can be used only to a limited degree here. Hence, only a limited selection of ceramic materials may be used for such fibers, which makes it difficult or next to impossible to modify the properties of the porous ceramic produced therefrom. Moreover, such porous structures are flexible since the fibers are not joined to one another at the contact points. This is disadvantageous in the case of filtration or mechanical loads, since these ceramics are not very stiff overall and, in addition, fiber abrasion is produced, especially with multifilaments.

Joining of such fibers can also be undertaken, see U.S. Pat. No. 5,075,160; although this is only of interest for the typical applications if ceramic joining is created. This, too, is difficult and expensive to achieve, generally using CVD or CVI techniques, but the choice of materials is again very limited.

In addition, it is known to manufacture open-pored materials from polymer fibers, natural fibers, or carbon fibers, and then to convert them directly to a ceramic material, e.g., by pyrolysis or with the addition of other chemical elements through the fluid or gas phase and reaction of the fibers with these elements. However, the conversion of these starting fibers to open-pored ceramics is complicated and can only be controlled by costly methods; this severely limits the choice of materials and geometries.

SUMMARY OF THE INVENTION

The present invention relates to a ceramic network and a method for the production thereof in which the mechanical strength is improved and/or an application-specific structure of the ceramic network can be specifically controlled.

The present invention provides for a method for producing a ceramic network from a fiber network comprising fiber selected from polymer fiber, natural fiber or mixtures thereof comprising the steps of impregnating the fiber network with a ceramic suspension, removing excess ceramic suspension from the impregnated fiber network, drying the impregnated fiber network, removing the fiber network, and sintering the remaining network to form the ceramic network.

The fiber can have a cross-sectional area having a circular, a substantially circular, a convex or a multiply convex outline.

The fiber network can be impregnated one or more times with a ceramic suspension.

The fiber network can be a structured or an unstructured network. The fiber network may be a structured network having a uniform structure, a repetitive structure, or a combination thereof. The structured fiber network can have a directionally dependent structure.

The fiber network can be a two-dimensional connection of the fibers, a three dimensional connection of the fibers or combination thereof and the fibers can be connected by gluing, bonding, plaiting, felting, weaving, knitting, embroidering, sewing, embossing or a combination thereof.

The fiber can be selected from polyester, polyethylene, polyamide, cotton, cellulose, coco, jute, hemp, flax, horsehair, or mixtures thereof.

The fiber can be coated with a material other than ceramic or the fiber can be uncoated.

The fiber network can be removed by etching the fiber network, dissolving the fiber network or bacteriologically removing the fiber network. The fiber network can be removed by burning out the fiber network by increasing temperature in a linear or nonlinear fashion or in stages. Burning out the fiber network can take place in air, a reducing atmosphere, an oxidizing atmosphere or an inert atmosphere. The burning out of the fiber network can be completely accomplished or can be substantially free of residue.

The burning out of the fiber network can take place by increasing temperature in stages and during which substantially residue-free burnout occurs in the first or one of the first temperature stages.

The fiber network can have completely, substantially or partially the shape and/or structure of a component to be manufactured from the ceramic network.

The present invention also provides for a ceramic network comprising struts being joined together two-dimensionally or three dimensionally, having a material-consistent connection to one another and having an interconnected cavity over their points of contact, the cavity having a cross-sectional area with a circular, substantially circular, a convex, or multiply convex outline.

The ceramic network can have a two-dimensional or three dimensional structure shaped differently depending upon a direction of fluid flow through the ceramic network.

The two-dimensional or three dimensional structure of the network can be uniform, repeating or a combination thereof.

The two-dimensional or three dimensional stricture of the network can be directionally dependent and uniform, repeating or a combination thereof.

The ceramic network can have a shape and/or structure which corresponds entirely, substantially or in part with the shape or the structure of a component to be manufactured.

The ceramic network has many utilities. The ceramic network may be used as a ceramic filter for contacting fluids, as a ceramic filter for contacting molten material or as a molten metal filter. The ceramic network may be used as a deep-bed filter, a support for filtration, a heat exchanger or as a heat regenerator.

The ceramic network may be used as a catalyst support, as a reaction chamber fill element, as a burner element for radiant heaters or for space heaters, as a heat element for a thermostat, as a control element for a thermostat, or as a burner element for space heaters.

The ceramic network may be used for supporting a mechanical load, as a sound damping element, as a stiffening element for lightweight building elements, as a mirror support, as a thermal protective tile, as a ceramic reinforcement material for metal matrix composites, as a burner element for space heaters or as a ceramic reinforcement material for light metal alloy.

The ceramic network may be used as a brake material, as an abrasive or as a carrier for an abrasive.

Using the solution according to the present invention, a two-dimensional or three-dimensional ceramic network is obtained whose ceramic struts have cavities with a cross-sectional area having a circular or nearly circular or largely circular or a convex or multiply convex outline. In this way, a uniform coating thickness, e.g., a uniform load-bearing area, is achieved. Furthermore, formation of cracks can largely be avoided, so that the ceramics according to the present invention and manufactured in accordance with the invention demonstrate greater mechanical strength.

For some applications of open-pored ceramic networks, e.g., for use as a filter material, regenerator, or sound damper, it is important for the structure of the cast foams to be nearly the same in each direction in space. This is achievable with the open-pored foam ceramics known from the prior art, but can likewise be achieved with the ceramic network in accordance with the present invention.

For some applications, however, it is a great advantage if the ceramic network can be constructed with a specific structure in one or two or all three directions in space. The structure can be uniform and/or repeated in an advantageous manner here. This means that a uniform, directionally dependent structure—with as many repeats as desired—of the fiber network, for example, a woven cotton fabric with a woven-in pattern, can produce a ceramic network with exactly the same structure.

In the case of the flowing-through of gas or fluids, it can be advantageous to produce a predominant direction or, in the case of use as a reinforcement for metals, to achieve a predominant direction of mechanical strength. Structuring of the ceramic network in such a way is not known and cannot be achieved in the prior art, but can be produced easily with the method in accordance with the present invention.

For example, a knitted fabric or knit can be produced such that flow through it in one direction in space is nearly unhindered. A ceramic network can then be produced without difficulty from this knitted fabric or knit using the method in accordance with the present invention.

Another advantage of the solution according to the present invention is that relatively large cell sizes can be produced with the ceramic network in accordance with the present invention.

In the prior art methods, the polymer foams used as a basis for the open-cell ceramic foams can only foam to a certain level. When this point is exceeded, the open-celled structure of the foams is destroyed more and more and the foam finally collapses. The maximum achievable cell size is approximately 5 mm.

Using the method in accordance with the present invention, ceramic networks with far larger cell sizes can be produced easily.

In addition, it is advantageous if the starting structure is manufactured of polymer fibers and/or natural fibers or polymer and/or natural fiber bundles, because harmless decomposition products which are not toxic or hazardous to the health are created when the fibers or fiber bundles are removed or burned out.

The increase in temperature when burning out the fiber network can be chosen such that it takes place in linear or nonlinear fashion or in stages. All possible atmospheres may be present during the process. Burnout takes place until the fiber network is burned out completely or nearly completely free of residue.

When temperature increase in stages is chosen for this purpose, it is advantageous if the burnout occurs in the first or one of the first temperature stages.

The present invention provides a method for producing a ceramic network in which a material-consistent connection exists among the individual ceramic struts. Material-consistent here means that the struts and the connection between the struts are made of the same material.

Moreover, in the ceramic network according to the present invention, there exists an interconnection among the cavities in the struts and, in particular, interconnected cavities are also present at the points of contact between the struts. This is produced by the manufacturing process in accordance with the present invention in which a contact point between two fibers, for example, is enveloped as a whole by the ceramic suspension and, after both fibers have been burned out, the ceramic struts are continuous and also have a continuous cavity at the points of contact.

In the method according to the present invention, fibers that are uncoated or completely uncoated with ceramic material are used advantageously.

It is also possible here for a fiber bundle, for example, to be surrounded by an enveloping enclosure.

It is also advantageous for a network to be designed such that it completely or essentially completely or partially corresponds, with regard to its shape and/or structure, to the shape and/or structure of the component to be manufactured.

To this end, a fiber network is manufactured which completely or essentially completely or partially has the shape and/or structure of the desired component to be manufactured. This fiber network is then treated in accordance with the present invention and the desired ceramic network is created.

During manufacture of the ceramic network, reduction in size as compared to the fiber network may take place as a result of shrinkage, even though shape and/or structure still may correspond to that of the desired component.

DETAILED DESCRIPTION OF THE INVENTION

The present invention is explained in greater detail below with several exemplary embodiments.

EXAMPLE 1

A standard commercial 40×40×20 mm$^3$ carrier mat of glued, extruded polyamide monofilaments whose individual fibers have a round cross-section of approximately 350 $\mu$m is used as a starting network. This network is impregnated with a water-based ceramic suspension with a solids content of 60%. The ceramic solid consists of 80% SiC powder with a bimodal grain size distribution with two grain size maximum of 6 and 20 $\mu$m and up to 20% clay. The excess suspension is separated out in a centrifuge to a mass of 35 g. Then the coated mat is dried and the polyamide filaments are burned out. Subsequently, sintering is performed at 1200° C. in air in a retort furnace. The sintered ceramic network has the same three-dimensional network structure as the polyamide carrier mat. The struts of the ceramic network of SiC ceramic are hollow. The cavities have a round cross-section with a diameter of approximately 350 $\mu$m. The individual strength of the struts was determined (J. Am. Ceram. Soc. 72(6) 885–889) and compared to a ceramic foam that was produced from the same ceramic material using a polyurethane foam with a cell size of 10 ppi as the starting network. The strength of the individual struts of this known ceramic foam is 90 MPa obtained as the average of 20 measurements. In the ceramic network according to the present invention, the strength of the individual struts of the ceramic network of the present invention was determined to be 160 MPa.

EXAMPLE 2

A standard commercial three-dimensional structure with the dimensions 60×60×10 mm$^3$ is used as a starting network for manufacturing a knit spacer from dtex277 polyester monofilaments using knitting technology. This knit spacer consists of two densely knit surfaces that are connected at a distance of approximately 10 mm by spreader filaments arranged nearly parallel. The parallel filaments are spaced approximately 1 mm apart from one another. This knit spacer fabric is impregnated with a water-based ceramic suspension with a solids content of 60%. The ceramic solid consists of an SiC powder with an average grain size of 1 $\mu$m. The excess suspension is separated out in a centrifuge to a mass of 20 g. Then the coated knit spacer is dried and the polyester filaments are burned out at 600° C. in an argon atmosphere. Subsequently, sintering is performed at 2300° C. in an argon atmosphere. The sintered ceramic network has the same directionally dependent three-dimensional network structure as the polyester knit spacer. The struts of the ceramic network of SiC ceramic are hollow. The cavities have a round cross-section with a diameter of approximately 150 μm.

The compressive strength of the ceramic network differs depending on the direction. The strength measured perpendicular to the direction of the parallel spreader struts is more than twice as much as was measured parallel thereto.

EXAMPLE 3

A standard commercial 125×40×20 mm3 felt of flax fibers, in which the individual fibers have a rounded cross-section as a starting network are joined to one another by a latex adhesive. This network is impregnated with a water-based ceramic suspension with a solids content of 78% by weight. The ceramic solid consists of a standard commercial $Al_2O_3$ sinter mixture with an average grain size of 5 μm. The excess suspension is separated out in a centrifuge to a mass of 60 g. Then the coated felt is dried and the flax fibers are burned out in air. Subsequently, sintering is performed at 1650° C. in air in a retort furnace. The sintered ceramic network has the same three-dimensional network structure as the flax felt, with a scale reduction of 20% caused by shrinkage of the ceramic during sintering. The struts of the ceramic network of $Al_2O_3$ ceramic are hollow. The cavities have a rounded cross-section.

EXAMPLE 4

A standard commercial structure is used as a starting network for manufacturing a knit spacer from polyester monofilaments using knitting technology. The polyester monofilaments have a round cross-section.

In the x-y direction, this knit spacer consists of uniform squares with sides that are 8 mm in length. The x-y surface extends over an area of 100×100 mm. From this surface, filaments extend diagonally from the corners of the squares in the z-direction in such a way that triangular channels result in the x-z direction while rectangular channels with 2 bent side surfaces spaced 8 mm apart result in the y-z direction. In the z-direction, a repeat of the x-y surface occurs at a spacing of 8 mm.

5 mats, 100×100×8 mm, made of this knit spacer are adhered atop one another using standard commercial thermoset bonding sheets such that the corner points of the squares lie on top of one another. Hot-wire cutting is used to produce 40×40×24 mm blanks from this 5-layer mat in such a fashion that one 40×40 mm area lies in each of the 3 different directions in space, x, y, z. These blanks are impregnated with a water-based ceramic suspension with a solids content of 60%. The ceramic solid consists of an SiC powder with a bimodal grain size distribution with two grain size maximum of 6 and 20 μm. The suspension also contains 6% of a water-soluble resin. The excess suspension is separated out in a centrifuge until the impregnated blanks have a mass of 49 g. Then the coated blanks are dried and subjected to a two-stage temperature treatment in protective gas (argon) and/or under vacuum. In the first stage, the polyester filaments are removed at 600° C. in argon, then the blanks are brought in contact with a liquid molten silicon at a temperature of 1650° C. under vacuum, which causes the known bonding reaction of SiC particles to take place.

After cooling, 40×40×25 mm preforms are present with a 5-layered ceramic network, having ceramic struts that consist of reaction-bonded silicon carbide and are interconnected with material-consistent connections. The cross-sectional areas of the cavities in the ceramic struts are nearly circular. The network structure is identical in shape and size to that of the knit spacer described above.

Pressure drop measurements with air were performed on the ceramic preforms. The direction of flow was perpendicular to the 40×40 mm surface. At a flow volume of 20 l/s, pressure losses of 500 Pa, 750 Pa and 1500 Pa were measured in the 3 samples oriented in different directions. In addition, strength tests were performed by indenting with a cylindrical metal stamp having a diameter of 25 mm, where this indentation was made in the 40×40 surfaces and the force was measured at which the first struts of the samples broke. Breaking loads of 80 N, 400 N, and 450 N were measured on the 3 samples oriented in different directions.

EXAMPLE 5

A standard commercial mat is used as a starting network for manufacturing a knit spacer from polyamide monofilaments using knitting technology. The polyamide monofilaments have a round cross-section. This knit spacer consists in the x-y direction of parallelograms with sides 2 mm in length. The x-y surface extends over an area of 100×100 mm. From this surface, filaments extend vertically in the z-direction from the corner points of the squares in such a way that rectangular channels result in the x-z direction while square channels with 2 bent side surfaces spaced 8 mm apart result in the y-z direction. In the z-direction, a repeat of the x-y surface occurs at a spacing of 4 mm.

Hot-wire cutting is used to produce 40×40×24 mm blanks from this mat. These blanks are impregnated with a water-based ceramic suspension with a solids content of 60%. The ceramic solid consists of 85% SiC powder with a grain size of 5 μm, and 15% clay. The suspension also contains 6% of a water-soluble resin. The excess suspension is separated out in a centrifuge until the impregnated blanks have a mass of 35 g. The coated blanks are then dried, and solidified by curing the resin 2 h at 160° C. Then the polymer is removed by aging the samples 24 h in 10% hydrochloric acid. The samples are carefully washed, dried and then sintered in air at a temperature of 1150° C.

After cooling, 40×40×25 mm preforms are present with a ceramic network, having struts that consist of clay-bonded silicon carbide and are interconnected with material-consistent connections. The cross-sectional areas of the cavities in the ceramic strut have a nearly circular cross-section. The network structure is identical in shape and size to that of the knit spacer described above.

What is claimed is:

1. A method for producing a ceramic network from a fiber network comprising fiber selected from polymer fiber, natural fiber or mixtures thereof comprising:

impregnating the fiber network with a ceramic suspension, removing excess ceramic suspension from the impregnated fiber network, drying the impregnated fiber network, removing the fiber network, and sintering the remaining network to form the ceramic network, wherein the fiber has a cross-sectional area having a circular, a substantially circular, a convex or a multiply convex outline, the ceramic network comprising struts including cavities having a cross-sectional area with a circular, substantially circular, a convex, or multiply convex outline, said struts being joined together two-dimensionally or three dimensionally, having a material-consistent connection to one another and having an interconnected cavity over their points of contact.

2. The method according to claim 1, wherein the fiber network is impregnated one or more times with ceramic suspension.

3. The method according to claim 1, wherein the removing the fiber network comprises entirely removing the fiber network, substantially entirely removing the fiber network, partially removing the fiber network, or burning out the fiber network.

4. The method according to claim 1, wherein the fiber network is a structured or an unstructured network.

5. The method according to claim 4, wherein the fiber network is a structured network having a uniform structure, a repetitive structure, or a combination thereof.

6. The method according to claim 5, wherein the structured fiber network has a directionally dependent structure.

7. The method according to claim 4, wherein the fiber network is a two-dimensional connection of the fibers, a three dimensional connection of the fibers or combination thereof and the fibers are connected by gluing, bonding, plaiting, felting, weaving, knitting, embroiding, sewing, embossing or a combination thereof.

8. The method according to claim 1, wherein the fiber is selected from polyester, polyethylene, polyamide, cotton, cellulose, coco, jute, hemp, flax, horsehair, or mixtures thereof.

9. The method according to claim 1, wherein the fiber is coated with a material other than ceramic.

10. The method according to claim 1, wherein the fiber is uncoated.

11. The method according to claim 1, wherein the removing comprises etching the fiber network, dissolving the fiber network or bacteriologically removing the fiber network.

12. The method according to claim 1, wherein the removing, comprises burning out the fiber network takes place by increasing, temperature in a linear or nonlinear fashion or in stages.

13. The method according to claim 12, wherein the burning out the fiber network takes place in air, a reducing atmosphere, an oxidizing atmosphere or an inert atmosphere.

14. The method according to claim 12, wherein the burning out the fiber network is completely accomplished or is substantially free of residue.

15. The method according to claim 12, wherein the burning out the fiber network takes place by increasing temperature in stages and during which substantially residue-free burnout occurs in the first or one of the first temperature stages.

16. The method according to claim 1, wherein the fiber network has completely, substantially or partially the shape and/or structure of a component to be manufactured from the ceramic network.

17. A ceramic network produced by the process recited in the claim 1.

18. A ceramic network comprising struts including cavities having a cross-sectional area with a circular, substantially circular, a convex, or multiply convex outline, said struts being joined together two-dimensionally or three dimensionally, having a material-consistent connection to one another and having an interconnected cavity over their points of contact.

19. The ceramic network according to claim 18, wherein the two-dimensional or three dimensional structure of the network is shaped differently depending upon a direction of fluid flow through the ceramic network.

20. The ceramic network according to claim 18, wherein the two-dimensional or three dimensional structure of the network is uniform, repeating or a combination thereof.

21. The ceramic network according to claim 18, wherein the two-dimensional or three dimensional structure of the network is directionally dependent and uniform, repeating or a combination thereof.

22. The ceramic network according to claim 18, wherein the ceramic network has a shape and/or structure which corresponds entirely, substantially or in part with a shape or a structure of a component to be manufactured.

23. An article comprising the ceramic network of claim 18, wherein the article is selected from a ceramic filter for contacting fluids or molten material, a molten metal filter, a deep-bed filter, a support for filtration, a heat exchanger, a heat regenerator, a catalyst support, a reaction chamber fill element, a burner element for radiant heaters, space heaters or thermostats, a control element for a thermostat, a ceramic element capable of supporting a mechanical load, a sound damping element, a stiffening element for lightweight building elements, a mirror support, a thermal protective tile, a ceramic reinforcement material for metal matrix composites, a ceramic reinforcement material for light metal alloy, a brake material, an abrasive, or a carrier for an abrasive.

\* \* \* \* \*